(12) United States Patent
Irick, Jr. et al.

(10) Patent No.: US 6,312,822 B1
(45) Date of Patent: Nov. 6, 2001

(54) DISPERSION AIDS FOR OPTICAL BRIGHTENERS IN POLYOLEFINS

(76) Inventors: Gether Irick, Jr., 113 S. Patrick Dr., Gray, TN (US) 37615; Joe L. Farrar, 278 Dogwood Dr., Fall Branch, TN (US) 37656

( * ) Notice: Subject to any disclaimer, the term of this patent is extended or adjusted under 35 U.S.C. 154(b) by 0 days.

(21) Appl. No.: 09/199,904

(22) Filed: Nov. 25, 1998

Related U.S. Application Data

(60) Provisional application No. 60/087,037, filed on May 28, 1998.

(51) Int. Cl.$^7$ .............................. B32B 27/10; B32B 27/32
(52) U.S. Cl. ..................... 428/479.6; 428/481; 428/512; 428/513; 430/436; 524/94; 524/95
(58) Field of Search ................ 524/94, 95, 104, 524/105, 86; 428/513, 512, 514, 516, 515, 474.4, 479.6, 481; 430/536, 531, 538

(56) References Cited

U.S. PATENT DOCUMENTS

| | | | |
|---|---|---|---|
| 3,260,715 | 7/1966 | Saunders | 548/219 |
| 3,322,680 | 5/1967 | Hedberg et al. | 252/301.24 |
| 3,449,257 | 6/1969 | Tuite et al. | 252/301.28 |
| 3,501,298 | 3/1970 | Crawford | 430/536 |
| 4,106,941 | 8/1978 | Scullard et al. | 430/539 |
| 4,794,071 | 12/1988 | Tomko et al. | 430/538 |
| 4,859,539 | 8/1989 | Tomko et al. | 428/512 |
| 5,061,610 | 10/1991 | Carroll et al. | 430/532 |
| 5,173,397 | 12/1992 | Noda et al. | 430/531 |
| 5,340,854 | 8/1994 | Martic et al. | 524/94 |

FOREIGN PATENT DOCUMENTS

| | | | |
|---|---|---|---|
| 795 399 A1 | * | 9/1997 | (EP) . |
| 9-239883 | * | 9/1997 | (JP) . |

OTHER PUBLICATIONS

R. Zweidler and H. Hausermann, *Kirk–Othmer Encyclopedia of Chemical Technology*, 3$^{rd}$ ed., (Interscience, NY., 1978), IV, pp 213–226.

* cited by examiner

*Primary Examiner*—Paul Thibodeau
*Assistant Examiner*—D. Lawrence Tarazano

(57) ABSTRACT

A thermoplastic polyolefin composition suitable for use as a coating for a photographic support includes an optical brightener and a polar additive. The polar additive substantially compatibilizes the polar optical brightener with the non-polar polyolefin. A method for adding a polar additive to a polyolefin is also disclosed.

24 Claims, No Drawings

DISPERSION AIDS FOR OPTICAL BRIGHTENERS IN POLYOLEFINS

CROSS-REFERENCE TO RELATED APPLICATIONS

Benefit is claimed under 35 U.S.C. §119 to the earlier filed U.S. provisional application having U.S. Ser. No. 60/087,037 filed May 28, 1998, the entire disclosure of which is incorporated herein by reference.

FIELD OF THE INVENTION

The present invention relates to polymers having an optical brightener included therewith, and particularly to a polyolefin having a polar additive for compatibilizing the polyolefin with the optical brightener. The present invention further relates to a method of incorporating a polar additive into the polyolefin.

BACKGROUND OF THE INVENTION

The use of polyolefins, such as polyethylene, has become quite prevalent. A particularly useful application of polyolefins has been for a class of photographic supports. The photographic support generally includes a paper base material having a polyolefin coating. The polyolefin coating provides a very smooth surface when thin layers of a silver halide emulsion, are desired to be coated on the photographic paper.

The polyolefin coating can include an optical brightener and typically, a fluorescent whitening agent to make the white areas of the support even brighter. The optical brightener compensates for the yellow cast produced by the absorption of short-wavelength light such as violet to blue by the polyolefin. Typical optical brighteners fluoresce upon irradiation with ultraviolet light emitting visible light, typically bluish in hue, replacing the light that would have been lost and thereby enhancing the brightness of the support. Optical brighteners for use in such fields as photographic printing materials must absorb ultraviolet light, especially in the region from 280 to 405 nanometers (nm), and re-emit such light so as to enhance the brightness of the print. Desirably, the optical brightener has stability to temperatures as high as 310° C. to 330° C., so that it may be incorporated into the polyolefin during an extrusion process or film forming process and in extruding the polyolefin onto the paper based material.

It is desirable that the optical brightener be non-migrating so that it remains in the polyolefin coating and does not exude as a surface film on the polyolefin. Such exudation not only gives rise to a non-uniform brightness of the reflection surface, but also readily transfers to any other surface coming in contact with it. For example, a brightener transferred to the back side of the adjacent support layer when wound in roll can adversely affect subsequent coating and finishing operations of the photograph. This can result in the final product having a poor quality and performance.

It is recognized in the art that the addition of optical brighteners to polyolefins has been less than satisfactory. For example, U.S. Pat. No. 3,449,257 describes 2,5-bis (benzoxazolyl)thiophenes, such as Uvitex OB® available from Ciba Specialty Chemicals, as non-migrating brighteners for hydrophobic polymers, but were found to undergo bleeding and yellowing from a polyolefin film in U.S. Pat. No. 5,173,397

In an effort to improve the compatibility between hydrophobic or non-polar polyolefins and optical brighteners, U.S. Pat. Nos. 4,794,071 and 4,859,539 issued to Tomko, et al. on Dec. 27, 1988, and Aug. 22, 1989, respectively, disclose a mixture of optical brighteners that when incorporated into a pigmented polyolefin layer of a photographic support minimizes exudation of the brightener at the polyolefin surface. The mixture of optical brighteners include certain fluorescent bis (benzoxazolyl)stilbenes. U.S. Pat. No. 4,794,071 teaches that single component optical brighteners exhibit severe exudation when compared to the optical brightener mixture described in U.S. Pat. No. 4,794,071.

Accordingly, there is a need for the incorporation of an optical brightener into a non-polar polyolefin that will exhibit the good compatibility with the polyolefin and not exude as a surface film on the polyolefin.

Additionally, there is a need for a method of incorporating optical brighteners into hydrophobic or non-polar polyolefins which will enhance their brightening efficiency.

SUMMARY OF THE INVENTION

The present invention is for a thermoplastic polymer composition having an optical brightener and an effective amount of a polar compatibility additive to reduce the exudation of the optical brightener from the thermoplastic polymer.

Another aspect of the invention is for a method of incorporating into a thermoplastic polymer the polar compatibility additive. Desirably, the polar additive permits an increased amount of the optical brightener to be incorporated into the non-polar polymer without the disadvantages described above.

An advantage of the present invention is that optical brighteners previously not used with a polyolefin due to incompatibility of the materials can now be incorporated into the polyolefin.

It is an object of the present invention to provide a thermoplastic polymer containing at least one optical brightener and a compatibility polar additive.

Another object of the invention is to provide a polyolefin having an optical brightener and a polar compatibility additive which can be incorporated into a pigmented polyolefin layer of a photographic support.

It is another object of the invention to provide a method for incorporating a polar optical brightener into a polyolefin.

It is also an object of the invention to provide a method for incorporating a polar optical brightener into a polyolefin whereby the brightening efficiency of the optical brightener is enhanced.

Unexpectedly, we have found that the addition of a polar additive to a polyolefin improves the level of compatibility of the optical brightener with the polyolefin to thereby reduce or prevent the optical brightener's exudation from the polymer onto the surface of a film made from the polyolefin and may further result in an increased brightening efficiency of the optical brightener.

DETAILED DESCRIPTION OF THE INVENTION

Although it is known that the addition of optical brightener into a non-polar thermoplastic such as a polyolefin will improve the brightness of a film made from the polyolefin, it has been recognized that such optical brightening agents are generally incompatible. Polyolefins are typically non-polar compositions having very few polar functional groups, such as an ester, acid or alcohol. This non-polarity generally prevents polar materials such as, optical brighteners, from being satisfactorily incorporated into or bonded with the polyolefin. The non-compatibility contributes to the optical brightener exuding from the polyolefin. Unexpectedly, it has been discovered that the addition of a polar compatibility additive to the polyolefin will substantially improve the incorporation of and reduce the exudation of the optical brightener from the polyolefin without affecting the optical brightener performance. Accordingly, the composition of the invention includes a non-polar thermoplastic polyolefin having admixed, blended or melt-blended therein an optical brightener and a polar additive for compatibilizing the optical brightener and the polyolefin. Although the invention hereafter is described with particular reference as a polyolefinic coating for a photographic support, one skilled in the art will recognize and understand that other useful applications for such an optically brightened polyolefin may be utilized.

The thermoplastic polyolefin suitable for use in the invention can be any polyolefinic material known in the polymer art with particular relevance to the photographic art. Representative materials include homopolymers and copolymers of olefinic monomers such as ethylene, propylene, styrene, butylene, and mixtures thereof. Preferred polyolefins include linear low density, low density, medium and high density polyethylene. Polyethylene having a density in the range from about 0.90 grams/cm$^3$ to about 0.96 grams/cm$^3$ being preferred and a density of about 0.910 grams/cm$^3$ to about 0.925 grams/cm$^3$ being particularly preferred. The olefinic monomer can be copolymerized with one or more additional monomer moieties such as esters, carboxylic acids, amides, alcohols and other olefins. Specific examples of copolymerizable monomers include vinyl stearate, vinyl acetate, acrylic acid, methyl acrylate, ethyl acrylate, acrylamide, methacrylic acid, methyl methacrylate, ethyl methacrylate, methacrylamide, butadiene, isoprene, and vinyl chloride.

The optical brighteners can be any class of materials having an absorption in the range of 280–405 nanometers (nm) and an emission in the visible spectrum of from about 400–450 nanometers. The most useful optical brighteners include stilbenes, substituted stilbenes and stilbene derivatives. Suitable examples of such optical brighteners include bis(benzoxazolyl) stilbenes such as those disclosed in U.S. Pat. No. 4,794,071, the disclosure of which is incorporated herein by reference. Desirably, the optical brighteners include the optical brightener OB-1®, a stilbene available from Eastman Chemical Company, Kingsport Tenn. described in U.S. Pat. Nos. 3,260,715 and 3,322,680, and HOSTALUX® KS, a mixture of stilbenes available from Hoechst AG described in U.S. Pat. No. 4,794,071, the entire disclosures of each being incorporated herein by reference.

Other optical brighteners include mono(azol-2-yl) stilbenes, such as, 2-(stilben-4-yl)naphthotriazoles and 2-(4-phenylstilben-4-yl)benzoxazoles;

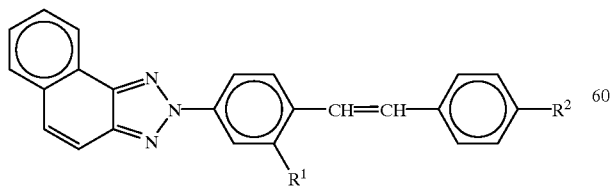

wherein R$^1$ is hydrogen or C≡N and R$^2$ is hydrogen or chlorine.

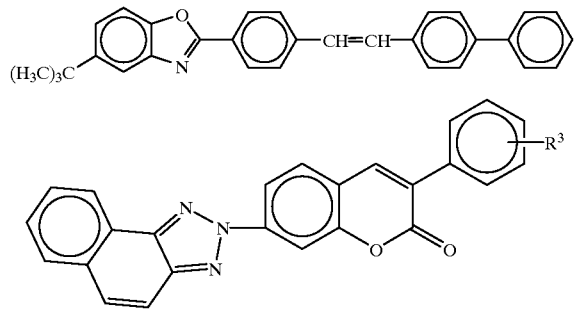

wherein R$^3$ is hydrogen or alkyl.

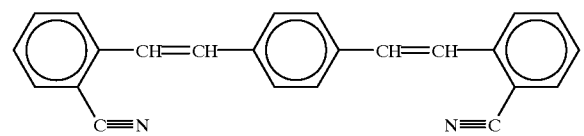

Bis(benzoxazol-2-yl) derivatives, such as:

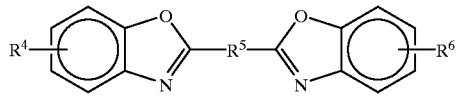

wherein R$^5$ is C$_2$H$_2$ and R$^4$ and R$^6$ are independently selected from alkyl or hydrogen, R$^5$ is

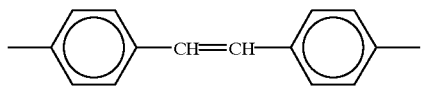

and R$^4$ and R$^6$ are independently selected from hydrogen and alkyl, R$^5$ is

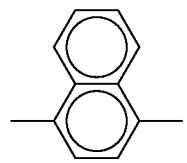

and R$^4$ and R$^6$ are independently selected from hydrogen, alkyl, COO-alkyl, and SO$_2$-alkyl, and R$^5$ is

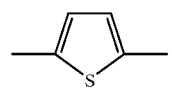

and R$^4$ and R$^6$ are independently selected from hydrogen and alkyl, wherein in all cases R$^5$ above represents a conjugated system.

Bis(benzimidazol-2-yl) derivatives of:

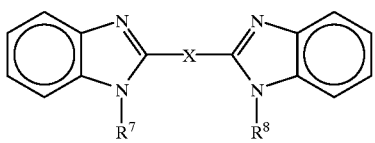

wherein "X" is $C_2H_2$ or

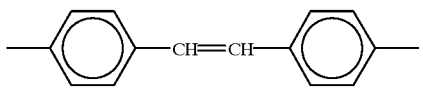

and $R^7$ and $R^8$ are independently selected from hydrogen, alkyl, hydroxyalkyl, and the like.

The amount of optical brightener included in the polyolefin range from about 0.001 to about 10 percent by weight based on the total weight of the polyolefin. Desirably, the amount of optical brightener is from about 0.01 percent to about 0.25 percent by weight based on the total weight of the polyolefin. Optionally, the brightener can be a mixture of one or more of the above identified optical brighteners.

The polar additives useful in the practice of the invention desirably are dispersible in the polyolefin without introducing undesirable levels of color or odor. The polar additives should be sufficiently compatible with the polyolefin so that they do not exhibit an undesirable level of exudation in the end use environment. The polar additive should further have a processing temperature that permits the polar additive to be blended, and preferably melt-blended, with the polyolefin under normal processing conditions. Additionally, the polar additives should not adversely degrade the properties of the polyolefins for their end use applications. Examples of polar additives include polymeric esters and specifically high molecular weight polyesters, oligomeric esters, polyamides having molecular weights and processing temperatures which permit their dispersion in polyolefins, nonpolymeric amides such as fatty acids amides of aliphatic amines and diamines, copolymers of poly(ethylene-coacrylic acid), esters of poly(alkylene glycols) and mixtures thereof. The molecular weight ranges and chemical composition for the optical brighteners desirably is chosen for the polar additive which will permit the optical brightener's processing. Polymeric esters which may be used to compatibilize the polyolefin can have a low molecular weight, i.e., less than about 5000 or a high molecular weight, i.e., greater than about 5000.

Polymeric esters which can be used include those materials well-known in the art as esters for plastics and fiber applications, including those know in the art as resins. Many difunctional acids and diols have been used to prepare polymeric esters, and mixtures of diacids and diols are well-known in the art. Typical examples include: poly (ethylene terephthalate); poly(ethylene terephthalate) modified with isophthalic acid; poly(ethylene terephthalate) modified with butanediol; poly(ethylene terephthalate) modified with propanediol; poly(ethylene terephthalate) modified with cyclohexanedimethanol; poly(ethylene terephthalate) modified with glycol ethers; poly (cyclohexylenedimethylene terephthalate); poly (cyclohexylenedimethylene terephthalate) modified with isophthalic acid; poly(butylene terephthalate); poly (butylene terephthalate) modified with adipic acid; poly (butylene terephthalate) modified with succinic acid; poly (butylene terephthalate) modified with glycol ethers; poly (ethylene adipate); poly(ethylene succinate); poly(propylene succinate); poly(propylene adipate); poly(butylene adipate); poly(butylene succinate) and mixtures thereof.

Low-molecular-weight polyesters would be materials typified by the above list, but having average molecular weights below 5000.

Oligomeric esters would include those materials described above, but having average molecular weights below 2500. This group includes those products known as polymeric plasticizers.

It is to be understood that as used herein molecular weights that are expressed above 10,000 are weight-average molecular weights, Mw, while molecular weights below 10,000 are number-average, Mn. Methods used in determining molecular weights of polymers are well known to those skilled in the polymer art and are presented, for example, in T.R. Crompton, "Analysis of Polymers", Pergamon Press, Oxford, p 222–242 (1989) and C.E. Carraher, Jr., "Polymer Chemistry", 4th ed., Marcel Dekker, NY p 81–106 (1996).

Polyamides include: polycaprolactam (Nylon 6); poly (hexamethylene adipamide) (Nylon 6/6); poly (hexamethylene nonanediamide) (Nylon 6/9); poly (hexamethylene sebacamide) (Nylon 6/10); poly (hexamethylene dodecanediamide) (Nylon 6/12); polyundecanolactam (Nylon 11); polylauryllactam (Nylon 12); poly(hexamethylene terephthalamide); poly (hexamethylene isophthalamide), and mixtures thereof.

Non-polymeric amides include amides derived from reactants in which either the amine or the acid functionality is monomeric, preventing polymerization. Examples include: hexamethylenediamine bis-lauramide; hexamethylene diamine bis-acetamide; N,N'-bis-octylterephthalamide; N,N'-bis-hexylisophthalamide; N,N'-bis-octadecylisophthalamide; ethylenediamine bis-stearamide and mixtures thereof.

Copolymers includes polymers having essentially a polyolefin backbone modified by a co-monomer such as acrylic acid, methacrylic acid, vinyl acetate, and the like. Typical examples include: poly(ethylene-co-acrylic acid); poly (ethylene-co-butyl methacrylate); poly(ethylene-co-decyl methacrylate); poly(ethylene-co-vinyl acetate), and mixtures thereof.

Esters of poly(alkylene glycols) include poly(alkylene glycols) derived from ethylene, propylene and higher intermediates (e.g. ethylene and propylene oxides), as well as mixed glycols. This class of polar additives includes of the esters of these poly(alkylene glycols) with monomeric acids. For example, polyethylene glycol-400) dilaurate, py(ethylene glycol-2000) diacetate, poly(ethylene glycol-5000) distearate, poly(propylene glycol-2000) dilaurate and mixtures thereof.

It is not necessary that the polar additive be a single composition. It can consist of mixtures within each of the classes such as a mixture of poly(butylene adipate) and poly(cyclohexylenedimethylene isophthalate), or mixtures of polar additives within different classes, such as, a mixture of oligomeric esters and a non-polymeric amide.

An effective amount of the polar additive is blended with the polyolefinic material to reduce the exudation of the optical brightener from the olefinic material by at least 10 percent, preferably about 20 percent and more preferably about 50 percent relative to an amount of exudation from a similar material void of any polar additive. Desirably, the amount of polar additive added to the polyolefinic material is from about 0.5 weight percent to about 20 weight percent, and more preferably from about 1.0 weight percent to about 5.0 weight percent, wherein the weight percents are based on the total amount of polar additive and polyolefin in the blend.

The polymer mixture may further include, if desired, colorants such as pigments and dyes which includes blue, violet or magenta pigments described in U.S. Pat. No. 3,501,298, titanium dioxide, zinc oxide or pigments such as barium sulfate, colloidal or amorphous silica, calcium carbonate and the like; antioxidants such as 4,4'-butylidene -bis(6-tert-butyl-meta-cresol), di-lauryl-3,3'-thiodipropionate, N-butylated-p-aminophenol, tetra(2,4-di-tert-butylphenyl)-4,4'-diphenyldiphenyldiphosphonite, 2,6-di-tert-butyl-p-cresol, 2,6-di-tert-butyl-4-methylphenol, N,N-disalicylidene-1,2-diaminopropane, octadecyl 3-(3',5'-di-tert-butyl-4'-hydroxyphenyl propionate) and combinations of the above; processing aids, such as higher aliphatic acid metal salts such as sodium stearate, potassium stearate, lithium stearate, magnesium stearate, calcium stearate, zinc stearate, aluminum stearate, calcium palmitate, sodium palmitate, zirconium octylate, sodium laurate, and salts of benzoic acid such as sodium benzoate, calcium benzoate, magnesium benzoate and zinc benzoate; antistatic agents; dispersing agents; ultraviolet stabilizers; coating aids; slip agents; lubricants and the like, as is well known to those skilled in the art. Additionally, emulsion side resins can contain one or more pigments.

The polymer mixture may be used in any application where the incorporation of an optical brightener in a polyolefinic material is important or desired. Desirably, the polymer mixture of the invention may be used in the imaging arts and more desirably on imaging paper suitable for thermal, digital, or a photographic support paper base material. The weight and thickness of the support can be varied depending on the intended use. A preferred weight range is from about 20 g/m$^2$ to about 500 g/m$^2$. Preferred thicknesses (those corresponding to commercial grade photographic paper) are from about 20 microns to about 500 microns. It is preferred to use a paper base material calendered to a smooth surface. The paper base material can be made from a suitable paper stock preferably comprising pulps made from hard or softwood. Either bleached or unbleached pulp can be utilized as desired. The paper base material can also be prepared from partially esterified cellulose fibers or from a blend of cellulose and suitable synthetic fibers such as a blend of cellulose and polyethylene fiber.

As is known to those skilled in the art, the paper base material can contain, if desired, agents to increase the strength of the paper such as wet strength resins which includes amino-aldehyde or polyamide-epichlorohydrin resins, and dry strength agents, such as starches, including both ordinary search and cationic search of polyacrylamide resins. Other conventional additives include water soluble gums such as cellulose ethers which includes carboxymethyl cellulose, sizing agents, such as a ketene dimer which includes sodium stearate and the like.

The polyolefin can be coated onto the paper base material by extruding the polymer from a hot melt as is known in the art. The paper base material may be treated with a corona discharge to obtain a good adhesion of the extruded polyolefin. The polymer can be extruded over a wide range of temperatures of from about 150° to about 350° C. and more preferably from about 310° to about 330° C. The polyolefin is coated onto the paper base material at a basis weight of about 1 g/m$^2$ to about 100 g/m$^2$ and a thickness of about 1 micron to about 100 microns.

Advantageously, the addition of a polar moiety into the polymer reduces or eliminates the exudation of the optical brightener from the polyolefin material. It has also been unexpectedly discovered that optical brighteners known to be incompatible with polyolefins such as Eastman Chemical Company's OB-1® may be used at significant cost advantages over optical brighteners previously used.

Another aspect of the present invention is a method for making a polyolefinic composition having an optical brightener and a compatibilizing polar additive. The method includes adding to a polymer, such as a polyolefin and preferably a non-polar polyolefin, an optical brightener and an effective amount of a polar additive to reduce the exudation of the optical brightener from the polyolefin. The polar additive may be added to the polyolefin using methods known to those skilled in the polymer art, such as, dry blending, admixing, or melt blending. Desirably, the polar additive is uniformly distributed within the polyolefin. Preferred methods of blending include melt extrusion, a kneader extruder, a roll mill, a high shear mixer or a twin screw compounder. The optical brightener may be blended with the polar additive before, contemporaneously with, or subsequent to the addition of the polar additive to the polyolefin. In a preferred embodiment, the optical brightener is melt blended with the polar additive before their blending with the polyolefin.

The following examples further illustrate the novelty and utility of the present invention are not for limiting the scope of the invention described herein.

EXAMPLE 1

A pelletized first mixture of an optical brightener and polar additive was prepared having 2.5 weight per cent OB-1® in PETG 6763, a poly(ethylene terephthalate) modified with 1,4-cyclohexanedimethanol. The optical brightener and polar additive were melt blended at a temperature of about 350° F. using a twin-screw extruder. The blend pellets were mixed with a low-density polyethylene and an anatase titanium dioxide as a whitening agent to form a second mixture having a final composition of about 0.15 weight percent optical brightener, about 2.0 weight percent polar additive, about 15.0 weight percent TiO$_2$ and the remainder polyethylene. This second mixture was melt blended using a single-screw extruder. This blend was then extruded into approximately 1-mil (0.001 inch thickness) film.

The CIE (Commission International d'Eclairage) b* value, an internationally accepted yellowness measurement was used as an indication of the extent of migration of the optical brightener to the surface of the film. A negative b* value indicates a blueness resulting from the fluorescence of the optical brightener; a positive b* value indicates a yellowness resulting from the presence of optical brightener particles on the surface of the film. The increase in numerical value of the b* indicates the relative amount of exudation of the optical brightener. Color measurement theory and practice are discussed in greater detail in Anni Berger-Schunn in "Practical Color Measurement", pp. 39–56 and 91–98 Wiley, NY (1994).

EXAMPLE 2

A second film was prepared in a manner similar to that described above for Example 1 but using the substituted stilbenes described in U.S. Pat. No. 4,859,539, (HOSTALUX® KS).

The film of Example 1 was examined under ultraviolet light (blacklight) alongside a the film produced in Example 2. The film of Example 1 was significantly brighter. After 4 weeks aging at room temperature, the film of Example 1 had a much lower exudation of optical brightener than did the film containing the blend of substituted stilbenes.

EXAMPLE 3

A total of thirty-three (33) samples were evaluated for exudation of an optical brightener from a 3 mil (0.003 inch thickness) polyethylene film.

Twenty-six (26) samples contained a polar additive in accordance with the invention. The samples were prepared using a similar procedure as described in Example 1. Optical brighteners OB-1® or HOSTALUX® KS were each independently melt blended with a sufficient amount of the polar additives: (1) PETG 6763, a poly(ethylene terephthalate) modified with 1,4-cyclohexanedimethanol; (2) ECDEL PCCE 9967, a polyester containing 1,4-cyclohexanedicarboxylic acid and poly(ethylene glycol) moieties; and (3) copolyester 14766, a polyester containing adipic acid and 1,4-butanediol moieties, all available from Eastman Chemical Company, to form a pelletized first mixture containing 2.5 weight percent of the optical brightener.

The 26 samples were tumble-blended with sufficient quantities of low-density polyethylene, anatase or rutile titanium dioxide pigments, and the first mixture above to form a second blend containing 0.05 weight percent or 0.15 weight percent optical brightener. The second blends were melt-blended using a Banbury mixer and melt-extruded into 3-mil films.

Seven of the 24 samples having no polar additive and containing 0.05 weight percent 0.15 weight percent and 0.25 weight percent optical brighteners were prepared by dry-blending a mixture of the powdered optical brightener, clear (no pigment) low-density polyethylene, and white-pigmented (anatase or rutile $TiO_2$) low-density polyethylene. These blends were then melt-blended in a Banbury mixer and extruded into a 3-mil film. The compositions and aging results of these films are shown in TABLE 1 below.

All formulations in the tables below are based on low density polyethylene available from Eastman Chemical Co., Kingsport, Tenn. The polar additive concentrations were 2.0 weight percent and $TiO_2$ concentrations were 15.0 weight percent. For samples 1–12 and 25–33 the optical brightener was OB-1® (available from Eastman Chemical Company) and for samples 13–24 the optical brightener was Hostalux® KS (available from Clariant Corp.).

TABLE 1

| Sample No. | Percent Optical Brightener | Polar Additive | Wt % Polar Additive | TiO2 | Yellowness (b*) after 60° C. for hours indicated | | | 88 hour b* Change |
|---|---|---|---|---|---|---|---|---|
| | | | | | 0 | 44 | 88 | |
| 1 | 0.05 | none | 0 | RCL 188[1] | −2.31 | 5.69 | 5.63 | 7.94 |
| 2 | 0.05 | 6763[3] | 2 | RCL 188 | −1.59 | 3.13 | 3.22 | 4.81 |
| 3 | 0.05 | PCCE[4] | 2 | RCL 188 | −3.17 | 2.96 | 3.09 | 6.26 |
| 4 | 0.05 | 14766[5] | 2 | RCL 188 | −1.74 | 0.78 | 1.24 | 2.98 |
| 5 | 0.05 | none | 0 | Kronos[2] | −8.3 | 4.22 | 4.44 | 12.74 |
| 6 | 0.05 | 6763 | 2 | Kronos | −6.76 | 0.3 | 0.86 | 7.62 |
| 7 | 0.05 | PCCE | 2 | Kronos | −8.15 | 0.34 | 0.77 | 8.92 |
| 8 | 0.05 | 14766 | 2 | Kronos | −6.45 | −1.77 | −0.91 | 5.54 |
| 9 | 0.15 | none | 0 | Kronos | 0.06 | 8.69 | 8.55 | 8.49 |
| 10 | 0.15 | 6763 | 2 | Kronos | −2.3 | 1.54 | 1.54 | 3.84 |
| 11 | 0.15 | PCCE | 2 | Kronos | −2.57 | 2.75 | 2.44 | 5.01 |
| 12 | 0.15 | 14766 | 2 | Kronos | −2.94 | −2.81 | −1.44 | 1.5 |
| 13 | 0.05 | none | 0 | RCL 188 | −2.92 | −1.8 | −0.78 | 2.14 |
| 14 | 0.05 | 6763 | 2 | RCL 188 | −3.55 | −2.26 | −1.74 | 1.81 |
| 15 | 0.05 | PCCE | 2 | RCL 188 | −3.39 | −2.52 | −1.94 | 1.45 |
| 16 | 0.05 | 14766 | 2 | RCL 188 | −2.91 | −1.72 | −1.19 | 1.72 |
| 17 | 0.05 | none | 0 | Kronos | −8.87 | −7.22 | −6.54 | 2.33 |
| 18 | 0.05 | 6763 | 2 | Kronos | −8.52 | −7.57 | −6.43 | 2.09 |
| 19 | 0.05 | PCCE | 2 | Kronos | −8.6 | −7.96 | −7.02 | 1.58 |
| 20 | 0.05 | 14766 | 2 | Kronos | −7.68 | −6.11 | −5.28 | 2.4 |
| 21 | 0.15 | none | 0 | Kronos | −6.89 | −0.44 | −0.06 | 6.83 |
| 22 | 0.15 | 6763 | 2 | Kronos | −10.34 | −6.16 | −5.36 | 4.98 |
| 23 | 0.15 | PCCB | 2 | Kronos | −10.63 | −8.14 | −7.02 | 3.61 |
| 24 | 0.15 | 14766 | 2 | Kronos | −2.69 | −2.55 | −1.72 | 0.97 |

[1]RCL 188 is Millenium RCL 188 Rutile Titanium Dioxide.
[2]Kronos is Kronos 1014 Coated Anatase Titanium Dioxide.
[3]6763 is Eastman PETG 6763.
[4]PCCE is Eastman ECDEL PCCE 9967.
[5]14766 is Eastman Chemical Co. Copolyester 14766.

Color measurements were made on the 24 sample films of Example 3 when freshly prepared, and after aging at 60° C. in a Blue M convection oven for the times shown.

Evaluation Numbers 1–4 of Table 1 above show the exudation rates of the optical brightener OB-1® at a concentration of 0.05 weight percent from a rutile-pigmented polyethylene during 60° C. aging. The changes in b* were much less for the formulations containing the polar additive.

Evaluation Numbers 5–8 of Table 1 above show the exudation rates of the optical brightener OB-1® at a concentration of 0.05 weight percent from an anatase-pigmented polyethylene during 60° C. aging. The changes in b* were much less for the formulations containing the polar additive.

Evaluation Numbers 9–12 of Table 1 above show the exudation rates of the optical brightener OB-1® at a concentration of 0.15 weight percent from an anatase-pigmented polyethylene during 60° C. aging. The changes in b* were much less for the formulations containing the polar additive.

Evaluation Numbers 13–16 of Table 1 above show the exudation rates of the optical brightener HOSTALUX® at a concentration of 0.05 weight percent from a rutile-pigmented polyethylene during 60° C. aging.

Evaluation Numbers 17–20 of Table 1 above show the exudation rates of the optical brightener HOSTALUX® at a concentration of 0.05 weight percent from an anatase-pigmented polyethylene during 60° C. aging.

Evaluation Numbers 21–24 of Table 4 show the exudation rates of the optical brightener HOSTALUX® at a concentration of 0.15 weight percent from an anatase-pigmented polyethylene during 60° C. aging. The changes in b* were much less for the formulations containing the polar additive.

EXAMPLE 4

A second set of samples were prepared as described in Example 3 above. The compositions and aging results of these films are shown in TABLE 2 below.

Evaluation Numbers 9–12 of Table 2 above show the exudation rates of the optical brightener OB-1® at a concentration of 0.15 weight percent from an anatase-pigmented polyethylene during 20–22° C. aging. The changes in b* were much less for the formulations containing the polar additive.

Evaluation Numbers 13–16 of Table 2 above show the exudation rates of the optical brightener HOSTALUX® at a concentration of 0.05 weight percent from a rutile-pigmented polyethylene during 20–22° C. aging.

Evaluation Numbers 17–20 of Table 2 above show the exudation rates of the optical brightener HOSTALUX® at a concentration of 0.05 weight percent from an anatase-pigmented polyethylene during 20–22° C. aging.

Evaluation Numbers 21–24 of Table 2 above show the exudation rates of the optical brightener HOSTALUX® at a concentration of 0.15 weight percent from an anatase-

TABLE 2

| Sample No. | Percent Optical Brightener | Polar Additive | wt % Polar Additive | TiO2 | Yellowness (b*) after 20–22° C. aging for weeks: 0 | 4 | 8 | 4 week b* Change |
|---|---|---|---|---|---|---|---|---|
| 1 | 0.05 | none | 0 | RCL 188 | −2.24 | 2.31 | 1.73 | 4.55 |
| 2 | 0.05 | 6763 | 2 | RCL 188 | −2.18 | 1.23 | 0.74 | 3.41 |
| 3 | 0.05 | PCCE | 2 | RCL 188 | −3.24 | 0.58 | 0.24 | 3.82 |
| 4 | 0.05 | 14766 | 2 | RCL 188 | −1.75 | −0.57 | −0.87 | 1.18 |
| 5 | 0.05 | none | 0 | Kronos | −8.29 | −0.58 | −0.88 | 7.71 |
| 6 | 0.05 | 6763 | 2 | Kronos | −6.77 | −2.41 | −2.72 | 4.36 |
| 7 | 0.05 | PCCE | 2 | Kronos | −8.21 | −3.34 | −3.48 | 4.87 |
| 8 | 0.05 | 14766 | 2 | Kronos | −6.53 | −5.87 | −6.16 | 0.66 |
| 9 | 0.15 | none | 0 | Kronos | 0.1 | 5.67 | 4.37 | 5.57 |
| 10 | 0.15 | 6763 | 2 | Kronos | −2.39 | −0.55 | −1.98 | 1.84 |
| 11 | 0.15 | PCCE | 2 | Kronos | −2.31 | −0.27 | −1.85 | 2.04 |
| 12 | 0.15 | 14766 | 2 | Kronos | −3.11 | −3.29 | −4.47 | −0.18 |
| 13 | 0.05 | none | 0 | RCL 188 | −2.96 | −2.77 | −2.36 | 0.19 |
| 14 | 0.05 | 6763 | 2 | RCL 188 | −3.55 | −3.45 | −3.63 | 0.1 |
| 15 | 0.05 | PCCE | 2 | RCL 188 | −3.39 | −3.32 | −3.67 | 0.07 |
| 16 | 0.05 | 14766 | 2 | RCL 188 | −2.84 | −2.26 | −2.86 | 0.58 |
| 17 | 0.05 | none | 0 | Kronos | −8.87 | −8.47 | −8.35 | 0.4 |
| 18 | 0.05 | 6763 | 2 | Kronos | −8.47 | −8.56 | −9.12 | −0.09 |
| 19 | 0.05 | PCCE | 2 | Kronos | −8.61 | −8.73 | −9.23 | −0.12 |
| 20 | 0.05 | 14766 | 2 | Kronos | −7.63 | −6.79 | −7.43 | 0.84 |
| 21 | 0.15 | none | 0 | Kronos | −6.88 | −4.03 | −4.08 | 2.85 |
| 22 | 0.15 | 6763 | 2 | Kronos | −10.46 | −9.54 | −10.55 | 0.92 |
| 23 | 0.15 | PCCE | 2 | Kronos | −10.55 | −9.51 | −9.7 | 1.04 |
| 24 | 0.15 | 14766 | 2 | Kronos | −3.02 | −2.24 | −4.06 | 0.77 |
| 25 | 0.025 | None | 0 | Kronos | −1.17 | −1.14 | | 0.03 |
| 26 | 0.025 | 6763 | 2 | Kronos | −7.39 | −4.8 | | 2.59 |
| 27 | 0.025 | PCCE | 2 | Kronos | −7.27 | −6.34 | | 0.93 |
| 28 | 0.025 | 14766 | 2 | Kronos | −6.21 | −6.05 | | 0.16 |
| 29 | 0.05 | PCCE | 4 | Kronos | −9.56 | −5.09 | −4.69 | 4.47 |
| 30 | 0.05 | PCCE | 6 | Kronos | −10.22 | −6.19 | −5.88 | 4.03 |
| 31 | 0.05 | D43T4 | 4 | Kronos | −7.09 | −6.1 | −5.59 | 0.99 |
| 32 | 0.05 | D43T4 | 6 | Kronos | −6.97 | −6.13 | −5.84 | 0.84 |
| 33 | 0.05 | MXD-6 | 2 | Kronos | −8.33 | −1.45 | −1.02 | 6.88 |

Color measurements were made on sample films of Example 4 when freshly prepared, and after aging at room temperature of about 20–22° C. for the times shown.

Evaluation Numbers 1–4 of Table 2 above show the exudation rates of the optical brightener OB-1® at a concentration of 0.05 weight percent from a rutile-pigmented polyethylene during 20–22° C. aging. The changes in b* were lower in the presence of the polar additive.

Evaluation Numbers 5–8 of Table 2 above show the exudation rates of the optical brightener OB-1® at a concentration of 0.05 weight percent from an anatase-pigmented polyethylene during 20–22° C. aging. The changes in b* were much less for the formulations containing the polar additive.

pigmented polyethylene during 20–22° C. aging. The changes in b* were much less for the formulations containing the polar additive.

Comparison of the -b* values for Evaluation Numbers 26–28 with the -b* values for Evaluation Number 5 after 4 and 8 weeks of aging shows that the polar additives greatly reduce the exudation rate of brightener at the lower concentration of 0.025 weight percent.

Comparison of the -b* values for Evaluation Numbers 29–32 with the -b* values for Evaluation Numbers 7 and 8 after 4 and 8 weeks of aging shows that the rate of exudation of brightener decreases with increasing concentration of the polar additive.

Comparison of the initial -b* values for Evaluation Numbers 7, 29 and 30 shows that the initial dispersion of the brightener (numerical value of -b*) increases with increasing concentration of the polar additive.

Comparison of Evaluation Number 33 with Evaluation Number 5 after 4 and 8 weeks of aging shows that the low-molecular-weight polyamide MXD-6 (obtained from Polymer Chemistry Innovations, Inc.) reduces the brightener exudation rate.

Surprisingly, except for number 24 in Table 2, a general comparison of the initial b* value of the films having an optical brightener concentration greater than about 0.10 weight percent, the polar additive had a beneficial effect by producing a more negative b* value.

Although the present invention has been shown and described in terms of the presently preferred embodiment(s), it is to be understood that various modifications and substitutions, rearrangements of parts, components and process steps can be made by those skilled in the art without departing from the novel spirit and scope of the invention.

We claim:

1. A thermoplastic composition comprising a polyolefin selected from the group consisting of homopolymers and copolymers of: polyethylene, polypropylene, and polybutylene; an optical brightener; and from about 0.5 weight percent to about 20 weight percent of a polar additive selected from the group consisting of polymeric esters, oligomeric esters, polyamides, fatty acids amides of aliphatic amines and diamines, copolymers of poly(ethylene-coacrylic acid), esters of poly(alkylene glycols) and mixtures thereof to reduce exudation of said optical brightener from said polyolefin and wherein the amount of polar additive is based on the total weight of said polar additive and said polyolefin.

2. The composition of claim 1 wherein said polyolefin is polyethylene having a density of from about 0.90 grams/cm$^3$ to about 0.96 grams/cm$^3$.

3. The composition of claim 2 wherein said polyethylene has a density of from about 0.910 grams/cm$^3$ to about 0.925 grams/cm$^3$.

4. The composition of claim 1 wherein said amount of polar additive is sufficient to reduce exudation of said optical brightener from said polyolefin by greater than 10 percent.

5. The composition of claim 1 wherein said amount of polar additive is sufficient to reduce exudation of said optical brightener from said polyolefin by greater than about 20 percent.

6. The composition of claim 1 wherein said amount of polar additive is sufficient to reduce exudation of said optical brightener from said polyolefin by greater than about 50 percent.

7. The composition of claim 1 wherein said amount of polar additive added to said polyolefin is from about 0.5 weight percent to about 5 weight percent, based on the total weight of said polar additive and said polyolefin.

8. The composition of claim 1 wherein said polyolefin is copolymerized with a monomer selected from the group consisting of esters, carboxylic acids, amides, alcohols and other olefins.

9. The composition of claim 8 wherein said monomer is selected from the group consisting of vinyl stearate, vinyl acetate, acrylic acid, methyl acrylate, ethyl acrylate, acrylamide, methacrylic acid, methyl methacrylate, ethyl methacrylate, methacrylamide, butadiene, isoprene, propylene, butene, hexene and vinyl chloride.

10. The composition of claim 1 wherein said optical brightener absorbs light having a wavelength of 280–405 nm and emits light having a wavelength of about 400–450 nm.

11. The composition of claim 1 wherein said optical brighteners are selected from the group consisting of mono (azol-2-yl)stilbenes, selected from 2-(stilben-4-yl) naphthotriazoles and 2-(4-phenylstilben-4-yl)benzoxazoles of the formula:

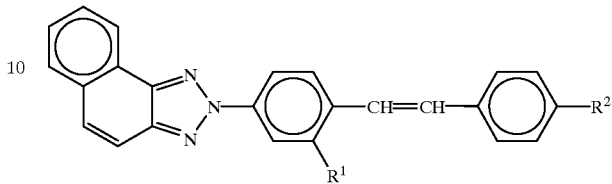

wherein R$^1$ is hydrogen or C≡N and R$^2$ is hydrogen or chlorine;

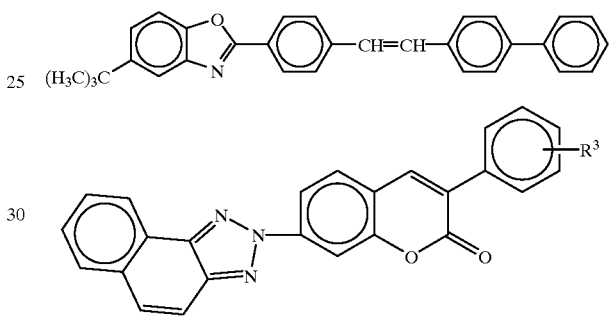

wherein R$^3$ is hydrogen or alkyl;

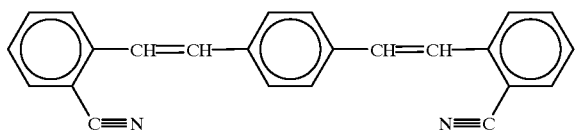

bis(benzoxazol-2-yl) having the formula:

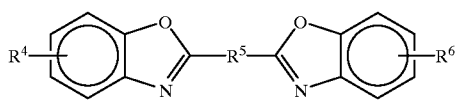

wherein R$^5$ is C$_2$H$_2$ and R$^4$ and R$^6$ are independently selected from alkyl or hydrogen, R$^5$ is

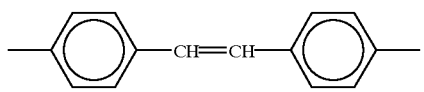

and R$^4$ and R$^6$ are independently selected from hydrogen and alkyl, R$^5$ is

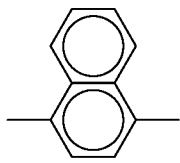

and $R^4$ and $R^6$ are independently selected from hydrogen, alkyl, COO-alkyl, and $SO_2$-alkyl, and $R^5$ is

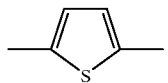

and $R^4$ and $R^6$ are independently selected from hydrogen and alkyl, wherein in all cases $R^5$ above represents a conjugated system; bis(benzimidazol-2-yl) derivatives of:

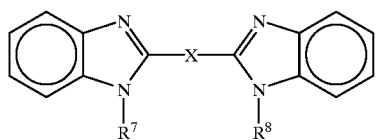

wherein "X" is $C_2H_2$ or

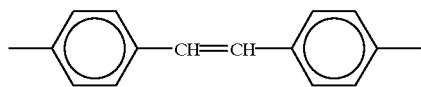

and $R^7$ and $R^8$ are independently selected from hydrogen, alkyl, hydroxyalkyl, and mixtures thereof.

12. The composition of claim 1 wherein the amount of optical brightener added to said polyolefin is from about 0.001 percent to about 10 percent by weight based on the total weight of the polyolefin and polar additive.

13. The composition of claim 1 wherein the amount of optical brightener added to said polyolefin is from about 0.01 percent to about 0.25 percent by weight based on the total weight of the polyolefin and polar additive.

14. The composition of claim 1 wherein said polar additive is selected from the group consisting of poly(ethylene terephthalate), poly(ethylene terephthalate) modified with isophthalic acid, poly(ethylene terephthalate) modified with butanediol, poly(ethylene terephthalate) modified with propanediol, poly(ethylene terephthalate) modified with cyclohexanedimethanol, poly(ethylene terephthalate) modified with glycol ethers, poly(cyclohexylenedimethylene terephthalate), poly(cyclohexylenedimethylene terephthalate) modified with isophthalic acid, poly(butylene terephthalate), poly(butylene terephthalate) modified with adipic acid, poly(butylene terephthalate) modified with succinic acid, poly(butylene terephthalate) modified with glycol ethers, poly(ethylene adipate), poly(ethylene succinate), poly(propylene succinate), poly(propylene adipate), poly(butylene adipate), poly(butylene succinate), polycaprolactam, poly(hexamethylene adipamide), poly(hexamethylene nonanediamide, poly(hexamethylene sebacamide), poly(hexamethylene dodecanediamide), polyundecanolactam, polylauryllactam, poly(hexamethylene terephthalamide), poly(hexamethylene isophthalamide), hexamethylenediamine bis-lauramide, hexamethylene diamine bis-acetamide, N,N'-bis-octylterephthalamide, N,N'-bis-hexylisophthalamide, N,N'-bis-octadecylisophthalamide, ethylenediamine bis-stearamide, poly(ethylene-co-acrylic acid), poly(ethylene-co-butyl methacrylate), poly(ethylene-co-decyl methacrylate), poly(ethylene-co-vinyl acetate), poly(ethylene glycol-400) dilaurate, py(ethylene glycol-2000) diacetate, poly(ethylene glycol-5000) distearate, poly(propylene glycol-2000) dilaurate and mixtures thereof.

15. The composition of claim 1 further including additional materials selected from the group consisting of colorants, antioxidants, heat stabilizers, antistatic agents, dispersing agents, coating aids, ultraviolet stabilizers, fillers, processing aids, slip agents, lubricants and mixtures thereof.

16. The composition of claim 15 wherein said additional materials arc selected from the group consisting of pigments, dyes, 4,4'-butylidene-bis(6-tert-butyl-meta-cresol), di-lauryl-3,3'-thiodipropionate, N-butylated-p-aminophenol, tetra(2,4-di-tert-butylphenyl)-4,4'-diphenyldiphenyldiphosphonite, 2,6-di-tert-butyl-p-cresol, 2,6-di-tert-butyl-4-methylphenol, N,N-disalicylidene-1,2-diaminopropane, octadecyl 3-(3',5'-di-tert-butyl-4'-hydroxyphenyl propionate), sodium stearate, potassium sterate, lithium sterate, magnesium stearate, calcium stearate, zinc stearate, aluminum stearate, calcium palmitate, sodium palmitate, zirconium octylate, sodium laurate, sodium benzoate, calcium benzoate, magnesium benzoate, zinc benzoate and mixtures thereof.

17. In an imaging support paper base material having a polyolefin coating and an optical brightener wherein the improvement comprises adding from about 0.5 weight percent to about 20 weight percent of a polar additive selected from the group consisting of poly(ethylene terephthalate), poly(ethylene terephthalate) modified with isophthalic acid, poly(ethylene terephthalate) modified with butanediol, poly(ethylene terephthalate) modified with propanediol, poly(ethylene terephthalate) modified with cyclohexanedimethanol, poly(ethylene terephthalate) modified with glycol ethers, poly(cyclohexylenedimethylene terephthalate), poly(cyclohexylenedimethylene terephthalate) modified with isophthalic acid, poly(butylene terephthalate), poly(butylene terephthalate) modified with adipic acid, poly(butylene terephthalate) modified with succinic acid, poly(butylene terephthalate) modified with glycol ethers, poly(ethylene adipate), poly(ethylene succinate), poly(propylene succinate), poly(propylene adipate), poly(butylene adipate), poly(butylene succinate), oligomeric esters, polycaprolactam, poly(hexamethylene adipamide), poly(hexamethylene nonanediamide, poly(hexamethylene sebacamide), poly(hexamethylene dodecanediamide), polyundecanolactam, polylauryllactam, poly(hexamethylene terephthalamide), poly(hexamethylene isophthalamide), hexamethylenediamine bis-lauramide, hexamethylene diamine bis-acetamide, N,N'-bis-octylterephthalamide, N,N'-bis-hexylisophthalamide, N,N'-bis-octadecylisophthalamide, ethylenediamine bis-stearamide, poly(ethylene-co-acrylic acid), poly(ethylene-co-butyl methacrylate), poly(ethylene-co-decyl methacrylate), poly(ethylene-co-vinyl acetate), polyethylene glycol-400) dilaurate, poly(ethylene glycol-2000) diacetate, poly(ethylene glycol-5000) distearate, poly(propylene glycol-2000) dilaurate and mixtures thereof admixed with said polyolefin.

18. The imaging support of claim 17 wherein said polyolefin is selected from the group consisting of polyethylene, polypropylene, polybutylene and copolymers thereof.

19. The imaging support of claim 18 wherein said polyolefin is copolymerized with a monomer selected from the group consisting of esters, carboxylic acids, amides, alcohols and olefins.

20. The imaging support of claim 19 wherein said monomer is selected from the group consisting of vinyl stearate, vinyl acetate, acrylic acid, methyl acrylate, ethyl acrylate, acrylamide, methacrylic acid, methyl methacrylate, ethyl methacrylate, methacrylamide, butadiene, isoprene and vinyl chloride.

21. The imaging support of claim 17 wherein said optical brightener is selected from the group consisting of stilbenes, substituted stilbenes, and mixtures thereof.

22. The imaging support of claim 17 wherein said paper base material is selected from the group consisting of thermal paper, digital paper and photographic paper.

23. The thermoplastic composition of claim 14 wherein said polar additive is selected from the group consisting of poly(ethylene terephthalate), poly(ethylene terephthalate) modified with isophthalic acid, poly(ethylene terephthalate) modified with butanediol, poly(ethylene terephthalate) modified with propanediol, poly(ethylenic terephthalate) modified with cyclohexanedimethanol, poly(ethylene terephthalate) modified with glycol ethers, poly(cyclohexylenedimethylene terephthalate), poly(cyclohexylenedimethylene terephthalate) modified with isophthalic acid, poly(butylene terephthalate), poly(butylene terephthalate) modified with adipic acid, poly(butylene terephthalate) modified with succinic acid, poly(butylene terephthalate) modified with glycol ethers, poly(ethylenic adipate), poly(ethylene succinate), poly(propylene succinate), poly(propylene adipate), poly(butylene adipate), poly(butylene succinate) and mixtures thereof.

24. The imaging support paper base material of claim 17 wherein said polar additive is selected from the group consisting of polymeric esters selected from poly(ethylene terephthalate), poly(ethylene terephthalate) modified with isophthalic acid, poly(ethylene terephthalate) modified with butanediol, poly(ethylene terephthalate) modified with propanediol, poly(ethylene terephthalate) modified with cyclohexanedimethanol, poly(ethylene terephthalate) modified with glycol ethers, poly(cyclohexylenedimethylene terephthalate), poly(cyclohexylenedimethylene terephthalate) modified with isophthalic acid, poly(butylene terephthalate), poly(butylene terephthalate) modified with adipic acid, poly(butylene terephthalate) modified with succinic acid, poly(butylene terephthalate) modified with glycol ethers, poly(ethylene adipate), poly(ethylene succinate), poly(propylene succinate), poly(propylene adipate), poly(butylene adipate), poly(butylene succinate), oligomeric esters and mixtures thereof.

* * * * *

UNITED STATES PATENT AND TRADEMARK OFFICE
CERTIFICATE OF CORRECTION

PATENT NO. : 6,312,822 B1
DATED : November 6, 2001
INVENTOR(S) : Gether Irick, Jr. and Joe L. Farrar It is certified that error appears in the above-identified patent and that said Letters Patent is hereby corrected as shown below:

<u>Title page,</u>
Insert Item [73], Assignee,
-- [73]   Assignee:   Eastman Chemical Company
                     Kingsport, TN --
Insert -- *Attorney, Agent, or Firm* - Jonathan Wood; Bernard Graves --

Signed and Sealed this

Twenty-fourth Day of September, 2002

Attest:

Attesting Officer

JAMES E. ROGAN
*Director of the United States Patent and Trademark Office*